US011232217B2

United States Patent
Ponsini (10) Patent No.: US 11,232,217 B2
(45) Date of Patent: Jan. 25, 2022

(54) MANAGING A SECURITY POLICY FOR A DEVICE

(71) Applicant: Oracle International Corporation, Redwood Shores, CA (US)

(72) Inventor: Nicolas Ponsini, Mougins (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 470 days.

(21) Appl. No.: 16/211,915

(22) Filed: Dec. 6, 2018

(65) Prior Publication Data

US 2020/0184089 A1   Jun. 11, 2020

(51) Int. Cl.
G06F 21/53   (2013.01)
G06F 21/62   (2013.01)
G06F 21/60   (2013.01)

(52) U.S. Cl.
CPC .............. *G06F 21/62* (2013.01); *G06F 21/53* (2013.01); *G06F 21/606* (2013.01); *G06F 2221/2149* (2013.01)

(58) Field of Classification Search
None
See application file for complete search history.

(56) References Cited

U.S. PATENT DOCUMENTS

| 8,935,746 B2 | 1/2015 | Vetillard |
| 9,231,965 B1 | 1/2016 | Vasseur et al. |
| 9,331,988 B2 | 5/2016 | Ponsini |
| 9,520,994 B2 | 12/2016 | Ponsini |
| 9,569,602 B2 | 2/2017 | Violleau et al. |
| 9,774,604 B2 | 9/2017 | Zou et al. |
| 9,860,257 B1 | 1/2018 | Kumar et al. |
| 10,089,467 B1 | 10/2018 | Hartnett et al. |
| 2006/0143446 A1* | 6/2006 | Frank ............... H04L 9/3234 713/164 |
| 2007/0192652 A1 | 8/2007 | Kao et al. |

(Continued)

FOREIGN PATENT DOCUMENTS

WO   2017/172434 A1   10/2017

OTHER PUBLICATIONS

Extended European Search Report dated Mar. 20, 2020 for corresponding application No. EP19214286.7-1218.

*Primary Examiner* — Fatoumata Traore
(74) *Attorney, Agent, or Firm* — Tarolli, Sundheim, Covell & Tummino LLP (57) ABSTRACT

A method for establishing and maintaining a security policy for a device can include establishing a secure channel between a secure execution environment (SEE) operating on the device and a security entity external to the device. The method can also include configuring, by a security manager executing on the SEE, access to sensitive operations of an environment interactor coupled to the device based on a security policy provided from the security entity. The method can further include resetting, by the security manager, a secure watchdog timer in response to a reset authorization token provided from the secure entity. If the secure watchdog timer expires a given predetermined number of times since a last reset authorization token is received, the security manager executes a given prescriptive operation dictated by the security policy.

20 Claims, 4 Drawing Sheets

(56) References Cited

U.S. PATENT DOCUMENTS

| | | |
|---|---|---|
| 2008/0271023 A1* | 10/2008 | Bone ................... H04L 41/00 718/100 |
| 2010/0242082 A1* | 9/2010 | Keene .................. H04L 63/14 726/1 |
| 2011/0055891 A1 | 3/2011 | Rice |
| 2015/0019710 A1* | 1/2015 | Shaashua ............. G06F 16/35 709/224 |
| 2015/0033004 A1* | 1/2015 | Smeets ............... G06F 9/4416 713/2 |
| 2015/0268952 A1 | 9/2015 | Ponsini |
| 2016/0036587 A1 | 2/2016 | Hans et al. |
| 2016/0134623 A1* | 5/2016 | Roth .................... H04L 9/3268 713/156 |
| 2016/0266943 A1 | 9/2016 | Hans |
| 2017/0104812 A1 | 4/2017 | Choi et al. |
| 2017/0346836 A1 | 11/2017 | Holland et al. |
| 2018/0109495 A1 | 4/2018 | Vasseur et al. |
| 2018/0144139 A1 | 5/2018 | Cheng et al. |
| 2018/0165088 A1 | 6/2018 | Bonar et al. |
| 2018/0196945 A1 | 7/2018 | Kornegay et al. |
| 2018/0219920 A1 | 8/2018 | Patel et al. |
| 2019/0095655 A1* | 3/2019 | Krawczewicz ....... H04W 12/06 |

\* cited by examiner

MANAGING A SECURITY POLICY FOR A DEVICE

TECHNICAL FIELD

The present disclosure relates to computer security. More particularly, this disclosure relates to a system and method for establishing and maintaining a security policy on a device.

BACKGROUND

A secure element (SE) is a tamper-resistant platform (typically a discrete integrated circuit secure microcontroller) capable of securely hosting and executing applications and confidential and cryptographic data for the hosted applications in accordance with the rules and security requirements set by well-identified trusted authorities. As one example, one of the hosted applications could be implemented as Java Card.

In some examples, an SE can be removable from another computing device. For example, an SE can be implemented as a removable subscriber identity module (SIM) card installed on a smart phone. Alternatively, the SE can be an embedded secure element (eSE) that is wired to another computing device. In still other examples, the SE can be an integrated secure element (iSE) that is directly integrated with a System on a Chip (SoC) hardware design. In this last case, the SE does not operate as a stand-alone device. Rather, the SE includes (secure) microprocessor and/or a (secure) microcontroller that is part of the design of a single integrated circuit to combine secure and non-secure processing environments.

A trusted execution environment (TEE) is a secure area of a main processor. A TEE ensures code and data loaded within the TEE is protected with respect to confidentiality and integrity. Thus, a TEE provides an isolated execution environment that provides security features, such as isolated execution and integrity of applications executing with the TEE, along with confidentiality of assets of the applications executed by the TEE. In general terms, the TEE offers an execution space that provides a higher level of security than a rich execution environment (REE), which REE may execute applications through a general purpose operating system (OS), such as a user-facing OS.

A botnet is a logical collection of internet-connected devices such as computers, smartphones or Internet of Thing (IoT) devices whose security has been breached and control ceded to a third party. Each such compromised device, known as a "bot", is created when a device is penetrated by software from a malware (malicious software) distribution. The controller of a botnet is able to direct the activities of these compromised computers through communication channels formed by standards-based network protocols such as Internet Relay Chat (IRC) and Hypertext Transfer Protocol (HTTP). As the ubiquity of IoT devices continues to grow, the dangers of botnets grow as well. In fact, the problems with botnets are so pervasive, that a botnet operating on IoT refrigerators was lampooned on the television series, Silicon Valley.

SUMMARY

One example relates to a method for establishing and maintaining a security policy for a device and can include establishing a secure channel between a secure execution environment (SEE) operating on the device and a security entity external to the device. The method can also include configuring, by a security manager executing on the SEE, access to sensitive operations of an environment interactor coupled to the device based on a security policy provided from the security entity. The method can further include resetting, by the security manager, a secure watchdog timer in response to a reset authorization token provided from the secure entity. If the secure watchdog timer expires a given predetermined number of times since a last reset authorization token is received, the security manager can execute a given prescriptive operation dictated by the security policy.

Another example relates to a non-transitory computer-readable storage medium storing program instructions that, when executed by a computing platform operating on a device, can cause the computing platform to perform a method. The method can include establishing a secure channel between a SEE operating on the device and a security entity external to the device. The method can also configuring, by a security manager executing on the SEE, access to sensitive operations of an environment interactor coupled to the device based on a security policy provided from the security entity. The method can further include resetting, by the security manager, a secure watchdog timer in response to a reset authorization token provided from the secure entity. If the secure watchdog timer expires a given predetermined number of times since a last reset authorization token is received, the security manager can execute a given prescriptive operation dictated by the security policy.

Yet another example relates to a device providing a computing platform, and the computing platform can include a rich execution environment (REE) for controlling operations of an environment interactor coupled to the device and a secure execution environment (SEE) operating on the device that communicates with a security entity external to the device via a secure channel. A security manager operating on the SEE can configure access to sensitive operations of the environment interactor coupled to the device based on a security policy provided from the security entity. The SEE can also include a secure watchdog timer that is reset in response to a reset authorization token provided from the secure entity. If the secure watchdog timer expires a given predetermined number of times since a last reset authorization token is received, the security manager can execute a given prescriptive operation dictated by the security policy.

DETAILED DESCRIPTION

The present disclosure directed to establishing and maintaining control of sensitive operations of a device (such as an Internet of Things (IoT) device) by the employment of a secure execution environment (SEE) even if the device has been hacked and/or the device is offline. Conventional device management products and mechanisms operate under the erroneous assumption that the software of the device is genuine and the integrity of the software (indicating that the software has not been modified) is guaranteed. Such devices can be hacked, preventing the device management system from functioning as expected.

In the examples described herein, a computing platform executing on the device is separated into multiple isolated execution environments, namely a Rich Execution Environment (REE) which is the host of the main Operating System of the device and a Secure Execution Environment (SEE) which is the host of sensitive assets and operations for the device. The isolation of those two environments ensures protection against software attacks. Depending on the configuration of the SEE, the level of hardware attacks countermeasures can vary. If the SEE is generated by a trusted execution environment (TEE), the SEE ensures software isolation but may have limited countermeasures against hardware attacks. However, if a secure element is included in addition to or in alternative of the TEE, the device can achieve a high level of security against both software and hardware attacks.

In some examples, the SEE can be directly embedded and integrated with the device platform and on the same security domain as device peripherals and/or sensors (environment interactors). Then, by acting as a secure master of the peripherals and/or sensors, the SEE selectively disables access to some (or all) of those peripherals and/or sensors. In this manner, applications executing on the REE have usage of the peripherals and/or the sensor, and while operating in parallel, the SEE configures such access to the peripherals and/or the sensors.

A remotely operated security entity administrates the SEE. Such administration permits updates and/or upgrades of assets and applications running within the SEE in a secure manner (e.g. via a secure channel). Operations of the SEE may be executed either online or offline through the use of a local agent, such as a security manager executing on the SEE. Moreover, the REE includes an administration agent that operates as a pass through of the secure channel between the security entity and the SEE to ensure bi-directional secure communication. The security entity manages a "security policy" that is stored in the SEE to facilitate management of the peripherals and/or sensors (e.g., environment interactors) coupled to the device. The remote entity can update the security policy on a periodic and/or asynchronous basis.

Furthermore, the SEE includes a secure watchdog timer. The secure watchdog timer is a programmable timer that allows the SEE to perform prescriptive (e.g., corrective and/or preventative) operations at regular intervals. Accordingly, the secure watchdog timer permits execution of sensitive code on a timely manner to process a security policy. More particularly, in some examples, the security entity can provide the reset authorization tokens for the secure watchdog timer in response to a confirmation that the REE is operating properly.

The SEE can store and apply the security policy. The SEE can store a value counting the number of times the secure watchdog timer has expired since the last reset authorization token was received from the security entity. The security policy associates prescriptive operations (e.g., corrective and/or preventative operations) to a number of timer expirations since the last reset authorization token is received. At the time the secure watchdog timer expires, the SEE checks if a new reset token has been received and, if not, the SEE applies the prescriptive operation identified in the secure policy which may include, but is not limited to any one of disabling an input/output (I/O) port, such as a Wi-Fi port (or other type of communication port), disabling access to a peripheral and/or a sensor controlled by the SEE and/or any combination thereof. This list and any other list is intended to disclose both disjunctive and conjunctive embodiments.

Figure 1:
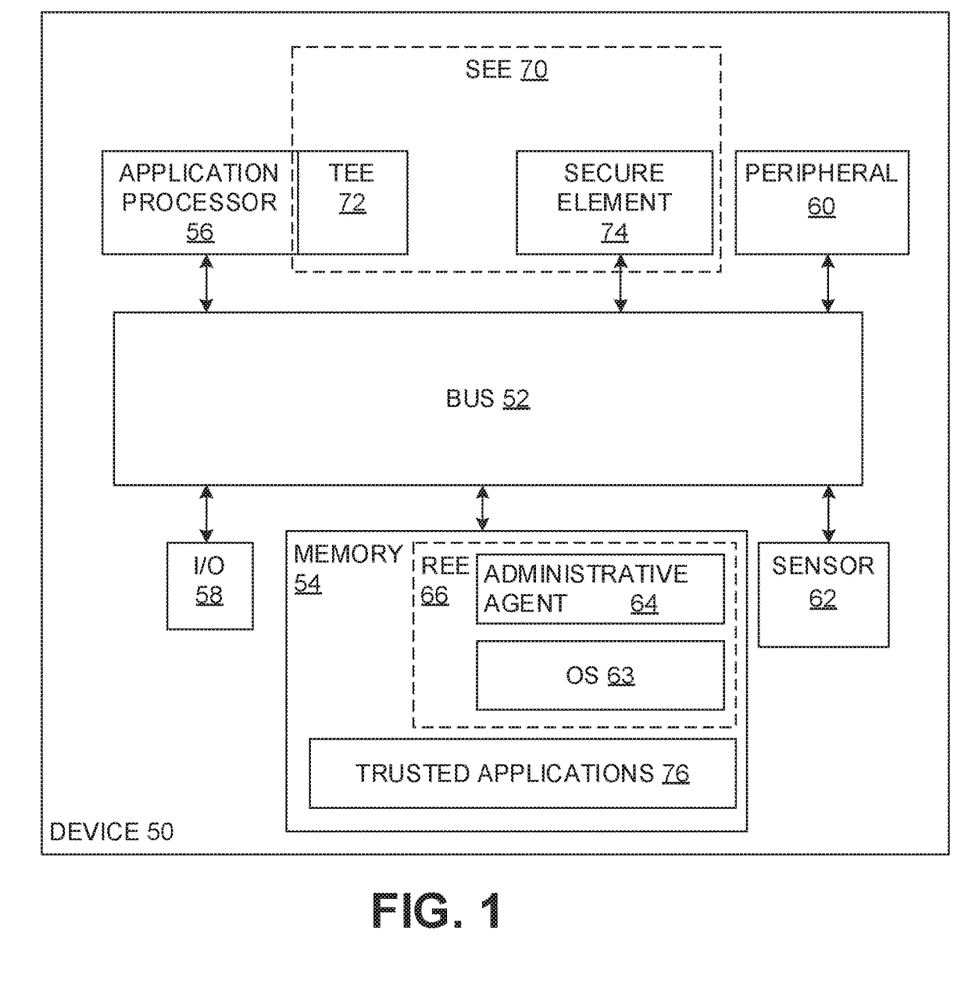
FIG. 1 illustrates a block diagram of an example of a device for implementing a computing platform that executes a secure execution environment (SEE).

FIG. 1 illustrates a block diagram of a device 50 (e.g., a hardware device) that can be employed to implement a security policy. The device 50 can deploy a computing platform with multiple execution environments executing in parallel. Moreover, the device 50 can include a bus 52 and/or other communication mechanisms that can communicate information between components of device 50. The device 50 can also include a memory 54 for storing machine readable instructions and data. The memory 54 can include any one or combination of random access memory ("RAM"), read only memory ("ROM"), static storage such as flash memory, a magnetic or optical disk, or any other type of non-transitory machine or computer-readable medium. The device 50 also includes an application processor 56, operatively coupled to the bus 52, that can process information and execute machine readable instructions or operations. The application processor 56 may be any type of general or specific purpose processor, such as an application specific integrated circuit (ASIC) chip. The device 50 further includes an input/output (I/O) port 58, such as a wireless or wired network interface card or other communications interface, to provide access to a network. As some examples, the I/O port 58 can represent any one or more of Wi-Fi port, a Bluetooth port, a Near Field Communication (NFC) port, a Universal Serial Bus (USB) port, an Ethernet port, a modem, a proprietary communication port and/or any combination thereof. Inclusion of the I/O port 58 allows an external system to interface the device 50 directly or remotely through a network or any other method.

A computer-readable medium may be any available medium that can be accessed by the application processor 56. The computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

The application processor 56 can also be operatively coupled via the bus 52 to a peripheral 60 and/or a sensor 62. As used herein, the term "environment interactor" refers to a peripheral 60 and/or sensor 62 that is configured to execute a particular task. In some examples, the peripheral 60 can be representative of peripherals of a standard computing device, such as a Liquid Crystal Display ("LCD"), a keyboard and/or a cursor control device (e.g., a mouse or trackpad) can also be operatively coupled to the bus 52 to enable the user to interface with the device 50. Additionally, the combination of the peripheral 60 and the sensor 62 can be representative of an environment interactor such as a biometric data collector, such as a fingerprint sensor, a (human) thermometer and/or a glucose monitor, etc. In still other examples, the peripheral 60 and/or the sensor 62 can be representative of a thermostat, a global positioning satellite (GPS) navigation system, a refrigerator, etc. In yet other examples, the peripheral 60 and/or the sensor 62 can be representative of smart card, including such as a passport, a subscriber identity module (SIM) card, an automatic teller machine (ATM) card, etc.

In some examples, the memory 54 can store software modules that may provide functionality when executed by the application processor 56. The modules can include an operating system 63, such as a rich OS. The memory 54 can also include an administrative agent 64 that can communicate with a secure execution environment (SEE) 70 of the device 50. The OS 63 can provide an operating system functionality for the device 50 to provide a rich execution environment (REE) 66 for applications, including the administrative agent 64.

The SEE 70 can be an execution environment of the computing platform that executes trusted operations. As used herein, the term "trusted operations" defines the execution of computer executable instructions that are deployed in a secure manner and that include countermeasures to prevent unauthorized access and/or modification. As one example, the SEE 70 can execute Java Card. The SEE 70 can be implemented as a trusted execution environment (TEE) and/or a secure element 74 communicatively coupled to the bus 52. The TEE 72 is a tamper resistant set of resources in the application processor 56 dedicated to the execution of trusted operations. In some examples, a portion of the memory 54 can be assigned to the TEE 72 for storing trusted applications 76. Additionally, in some examples as explained herein, a portion of the memory 54 can be assigned to the secure element 74. Each trusted application 76 includes computer executable instructions for executing trusted operations.

The application processor 56 includes at least a portion of resources that can execute non-trusted computer executable instructions. That is, at least a portion of the resources of the application processor 56 is permitted to execute computer executable instructions that are susceptible to unauthorized modification. However, as discussed herein, harm induced by such unauthorized modification is thwarted by operations of the SEE 70.

The secure element 74 is implemented as a discrete hardware device that is physically isolated from other components on the device 50. More particularly, the secure element 74 can be implemented as a tamper-resistant hardware platform that provides security from software attacks that originate outside the hardware platform through hardware mechanisms that applications outside the hardware platform cannot control, where software components are executable on the secure element 74. In some examples, the secure element 74 can be an embedded secure element (eSE) that is embedded within the device 50 and wired to other components of the device 50. In other examples, the secure element 74 can be an integrated secure element (iSE) that is directly integrated into the hardware design of the device 50, such as a situation where the device 50 includes a System on a Chip (SoC). In other examples, the secure element 74 can be removable from the device 50. In some examples, the secure element 74 can be at least one of the following: a (single) discrete IC chip, a chipset, a secured microcontroller, a universal integrated circuit card, a memory card or a smart card such as a subscriber identity module (SIM) card. In examples where the secure element 74 is implemented as an removable device or an eSE, the secure element 74 includes an internal memory for storing trusted applications separate from the memory 54. In examples where the secure element 74 is implemented as an iSE the secure element 74 can include internal memory and/or may share a portion of the memory 54 with the REE 66, even though confidentiality of the contents of the share portion of the memory 54 is maintained.

The SEE 70 can provide functionality for implementing a security policy and a secure watchdog timer for the peripheral 60 and the sensor 62 to prevent botnet and other malicious attacks on the device 50. The device 50 can also be part of a larger system. Thus, the device 50 can include other functional modules (not shown) to include the additional functionality.

Figure 2:
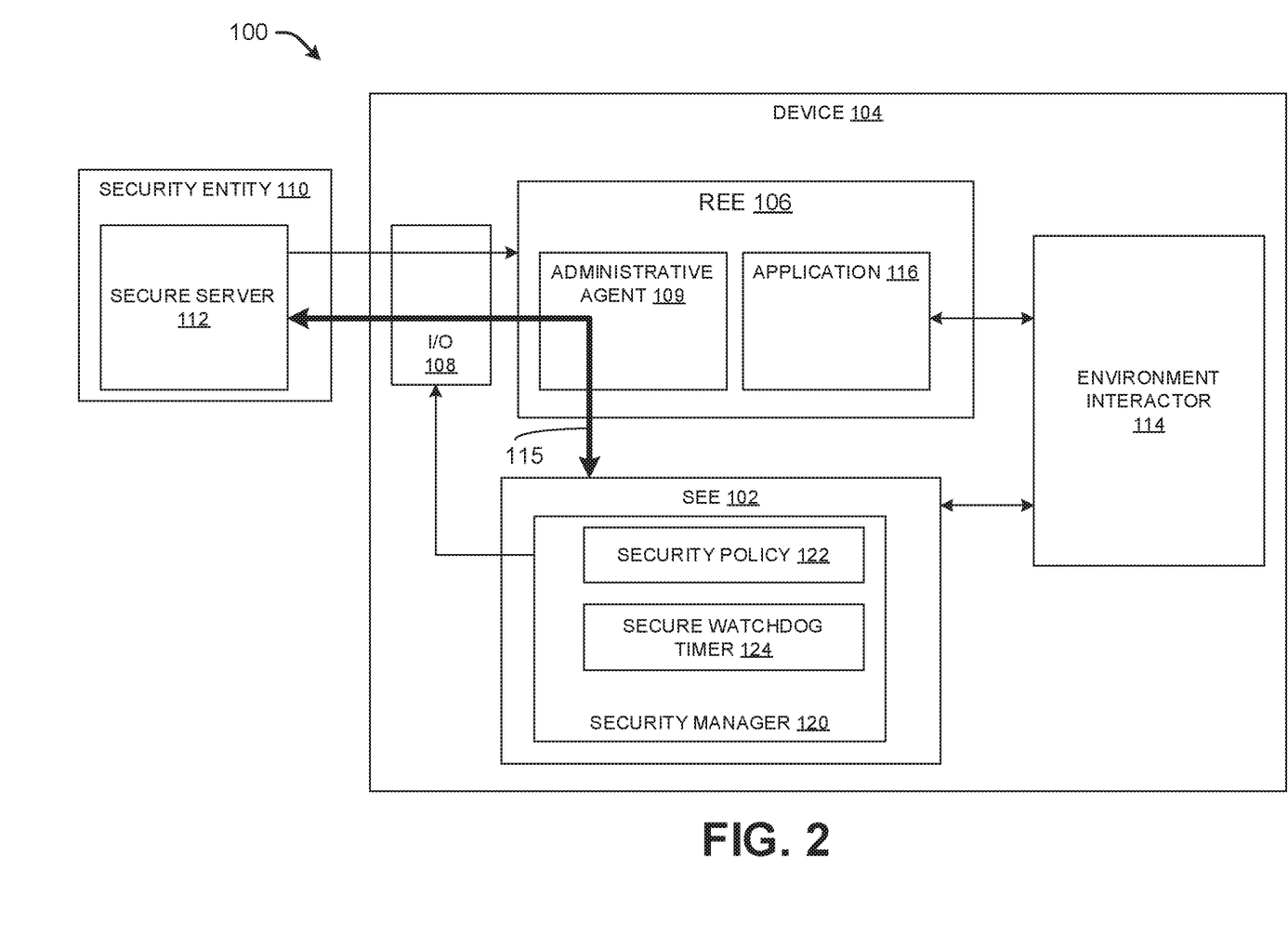
FIG. 2 illustrates a block diagram of an example of a system for implementing an SEE that establishes and maintains a security policy on a device.

FIG. 2 illustrates a block diagram of an example of a system 100 for establishing and maintaining a security policy with an SEE 102 operating on a device 104. In some examples, the device 104 can be, for example an Internet of Things (IoT) device. In other examples, the device 104 can be implemented as a device that facilitates authentication and/or integrity, such as a mobile phone (e.g., a smart phone), etc.

The device 104 can be implemented as a hardware device such as the device 50 of FIG. 1 that can implement a computing platform with multiple executing environments, including the SEE 102 and an REE 106 operating in parallel. The SEE 102 can be implemented with a TEE and/or an secure element. The REE 106 can be representative of a rich OS executing on an application processor. In examples where a TEE is included, the TEE executes in concert with the REE 106 on the same application processor. More particularly, execution of the TEE and REE 106 are serialized, such that the operations of the TEE and the REE 106 appear to executing in parallel. In a situation where the TEE is omitted, and the SEE 102 is implemented on a secure element, the SEE 102 and the REE 106 operate in parallel on separate processing devices.

The device 104 can include an I/O port 108 for communicating with an security entity 110, such as through a network or in a direct communication. The I/O port 108 can be a Wi-Fi port, a Bluetooth port a Near Field Communication (NFC) port, Universal Serial Bus (USB) port, an Ethernet port, a modem or a proprietary communication port. Additionally, the I/O port 108 can be representative of multiple different types of communication ports. The security entity 110 can be a computing platform that executes a secure server 112 for communicating with the SEE 102 in a manner described herein. The security entity 110 is remote from the device 104.

The REE 106 can include an administrative agent 109 executing thereon. The administrative agent 109 can provide an interface between the REE 106 (an untrusted computing environment) and the SEE 102 (a trusted computing environment). More particularly, the administrative agent 109 can operate as a conduit (pass through) for a secure channel 115 (with encrypted data) between the SEE 102 and the secure server 112.

In some examples, the secure channel 115 can be established by exchanging an asymmetric encryption key (e.g., a public key of a public/private key pair). More particularly, the secure channel 115 can be established with a standard encryption scheme, such as the Diffie-Hellman (DH) key exchange or the Elliptic Curve Diffe-Hellman (ECHD) key exchange. As one example, to establish the secure channel 115, the secure server 112 can provide a public key of a public/private key pair to the SEE 102. In response, the SEE 102 can be programmed to generate and encrypt a symmetric key with the public key of the secure server and transmit the encrypted symmetric key to the secure server 112 via the administrative agent 109. The secure server 112 can decrypt the symmetric key using the private key of the public/private key pair. In this manner, both the security entity 110 and the SEE 102 possess the symmetric key, and the symmetric key is securely passed from the SEE 102 to the security entity 110. In other examples, the secure channel 115 can be established using a predetermined symmetric key. In still other examples, other authentication techniques can be employed. In some examples, keys can be exchanged with authentication certificates that can leveraged to verify the authenticity of a sender of the key.

As one particular example, to establish the secure channel 115 between the SEE 102 and the secure server 112, the SEE 102 can receive a signed public key certificate of the secure server 112. The signed public key certificate can be issued by a trusted authority that securely stores a private key of an asymmetric encryption key pair (sometime referred to simply as a "key pair"). The signed public key certificate includes a public key of the asymmetric encryption key pair.

In response to the public key certificate, one or more of the trusted applications of the SEE 102 can be programmed to authenticate the public key certificate and to generate and encrypt a symmetric key with the public key included in the public key certificate and transmit the encrypted symmetric key to the secure server 112. The secure server 112 can decrypt the symmetric key using the private key of the public/private key pair. In this manner, both the SEE 102 and the secure server 112 possess the symmetric key, and the symmetric key is securely passed from the SEE 102 to the secure server 112 to establish the secure channel 115. In other examples, the secure channel 115 can be established using other authentication techniques, such as a predetermined symmetric key. In still other examples, other authentication techniques can be employed.

The device 104 can include an environment interactor 114. The environment interactor 114 can be implemented as a peripheral and/or a sensor to interact with an environment of the device 104. More particularly, in some examples, the environment interactor 114 can provide data characterizing observations of the environment to the SEE 102 and (in some examples) the REE 106. Additionally, in some examples, the environment interactor 114 can receive user input and/or provide user output (e.g., in a display). In still other examples, the environment interactor 114 can output digital and/or analog actuation signals that control external systems, such as amplifiers, relays, motors and heating and/or cooling systems, etc.

As some examples, the environment interactor 114 can be can be representative of peripherals of a standard computing device, such as any one or more of an LCD, a keyboard, a cursor control device and/or any combination thereof. Additionally, the environment interactor 114 can be representative of a biometric data collector, such as a fingerprint sensor, a (human) thermometer and/or a glucose monitor. In still other examples, the environment interactor 114 can be representative of a thermostat, a global positioning satellite (GPS) navigation system, a refrigerator, a video playback device, etc. In yet other examples, the environment interactor can be representative of smart card, including a smart card implemented as a passport, a SIM card, an automatic teller machine (ATM) card, a credit card, etc.

As used herein, a "sensitive operation" is an operation that, if executed in an unauthorized manner, can cause harm the device 104 and/or another entity. Sensitive operations include, but are not limited to one or more of communications via the I/O port 108, actuation signals, access to memory local to the environment interactor 114 that stores confidential information (e.g., credit card numbers, biometric data, etc.) and/or any combination thereof.

The device 104 can execute Java Card to implement the SEE 102. Java Card refers to a specific software technology that allows Java-based applications (applets) to be run securely on smart cards and similar small memory footprint devices, including the TEE. Java Card gives the ability to program the devices and make the SEE 102 application specific. Java Card is employable for example, in situations where the SEE 102 includes a secure element implemented as a smart card, such as a situation where the secure element is implemented as a SIM cards (used in mobile phones), ATM cards and/or credit cards. In some examples, the Java-based applications can conform to standards, such as standard set forth in the GlobalPlatform.

The GlobalPlatform sets standards for operations of the secure element 74 and the TEE 72 of FIG. 1 to support the SEE 102. The standards provided by the GlobalPlatform can include, for example, procedures for completing establishing a secure channel, such as the secure channel 115 and/or executing a transaction, such as a financial transaction. Additionally, the GlobalPlatform includes standards for contactless secure elements that are powered remotely as well as standards for secure elements that are powered through physical contact with a reader.

As used herein, the term "smart card", refers to a secure hardware device that can operate as a communication endpoint. A smart card is a device that includes an embedded integrated circuit that can be either a secure microprocessor (e.g., microcontroller) and memory or equivalent intelligence with internal memory or a memory chip alone. The smart card connects to a reader with direct physical contact or with a remote contactless radio frequency interface. With an embedded microprocessor and memory smart cards have the unique ability to store data, execute on-card functions (e.g., encryption and mutual authentication) and interact intelligently with a smart card reader. Many smart cards include an embedded private key and a corresponding public key that can be employed for establishing a secure communication channel, such as the secure channel 115.

The SEE 102 can include a security manager 120 executing thereon. The security manager 120 can be a trusted application. The environment interactor 114 can interact with an application 116 (e.g., a software application) executing on the REE 106. The application 116 executing on the REE 106 control operations of the environment interactor 114. Concurrently, the environment interactor 114 also interacts with the security manager 120 executing in the SEE 102. The security manager 120 can store and apply a security policy 122 to the environment interactor 114. More particularly, the security manager 120 can control access to sensitive operations of the environment interactor 114 and/or the device 104. That is, the SEE 102, by executing the security manager 120, can operate as a secure master of the environment interactor 114.

The security policy 122 can be managed by the secure server 112 of the security entity 110. In some examples, the security policy 122 is provided from the secure server 112 via the secure channel 115 that traverses the administrative agent 109. Additionally or alternatively, updates to the security policy 122 are provided from the secure server 112 via the secure channel 115.

Additionally, the security manager 120 includes a secure watchdog timer 124 executing thereon. The secure watchdog timer 124 can be implemented as a trusted application. The secure watchdog timer 124 executes a timer and the security manager 120 counts the number of timer expirations since a most recent (last) reset authorization token is received from the secure server 112. In some examples, the secure watchdog timer 124 is based on an hardware mechanism managing a hardware timer in the SEE 102. Alternatively, the secure watchdog timer 124 can be implemented in a security domain of the REE 106, such as the portion of the memory 54 assigned to the TEE 72 for storing trusted applications 76 for the SEE 102. In either such situation, the security manager 120 executes a handler of the security watchdog timer 124.

The application 116 can communicate with the secure server 112 via the I/O port 108. Moreover, at regular intervals, the secure server 112 can query the application 116 with a keep-alive message or other status check to ensure that the application 116 is executing properly and has not been corrupted and/or modified in an unauthorized manner. Each time (or some subset thereof) that the application 116 responds to the keep-alive message, the secure server 112 can send a reset authorization token to the secure watchdog timer 124 via the secure channel 115. The reset message can be sent (or not sent) by the secure server 112 independently of messages (e.g., keep-alive message or other status check messages) sent to the application 116. Stated differently, the reset message sent via the secure channel 115 allows messages (including the reset message) to be passed from the secure server 112 to the SEE 102 independently from the status of the application 116 (which may be corrupted).

Each time the secure watchdog timer 124 expires, the security manager 120 checks for receipt of a reset authorization token. If the reset authorization token corresponding to the expiration of the secure watchdog timer 124 has been received since the last expiration of the secure watchdog timer, the security manager 120 updates a period interval for the timer expiration stored by the secure watchdog timer 124. In some examples, the period interval for the timer expiration can be reset to zero ('0'). Additionally, in some examples, the security manager 120 resets the count of the number of expirations of the secure watchdog timer 124 since the last reset authorization token was received. Conversely, if the secure watchdog timer 124 expires and the reset authorization token has not been received, the security manager 120 increments the value of the number of times the secure watchdog timer 124 has expired since the last reset authorization token has been received. Additionally, the security manager 120 consults the security policy 122 to determine whether a prescriptive operation is to be executed. The prescriptive operation dictated by the security policy 122 can be commensurate with the number of expirations of the secure watchdog timer 124 since the last reset authorization token has been received by the security manager 120.

In some examples, it is presumed that, if the secure watchdog timer 124 expires and no reset authorization token has been received at the SEE 102, the REE 106 has become corrupted and/or compromised. Accordingly, the prescriptive operation can include corrective operations and/or preventative operations that prevent the device 104 from executing unauthorized and/or harmful operations. More particularly, the security manager 120 can disable the sensitive operations of the environment interactor 114 and/or other components of the device 104. As an example, the security manager 120 can prevent the environment interactor 114 from outputting actuation signals. Additionally, the security manager 120 can disable or limit communications on the I/O port 108. Disabling the I/O port 108 or limiting communication on the I/O port to communications on the secure channel 115 can prevent the device 104 from operating as a bot (a node) in a botnet attack.

In some examples, the prescriptive operation dictated by the security policy 122 does not disable all operations of the environment interactor 114. For instance, in some examples, the environment interactor 114 can include a local memory that stores data characterizing observed conditions (e.g., temperature). In such a situation, the prescriptive operation dictated by the security policy 122 may allow reads to that memory (e.g., by the application 116) since such reads may considered non-sensitive operations.

Further, in some examples, the prescriptive operation dictated by the security policy 122 can periodically and/or asynchronously configure the I/O port 108 to allow the secure server 112 to overwrite a portion (or all) of the machine readable instructions and the data for the REE 106. As noted, in some examples, it is presumed that if the secure watchdog timer 124 expires a predetermined number of times and no reset authorization token has been received, that the REE 106 is corrupted and/or compromised. In such a situation, it may be prudent to erase the memory of the device 104 associated with the REE 106 and write over the memory to restore permitted operations of the REE 106. By implementing the SEE 102 in this manner, the security policy 122 can be deployed on the environment interactor 114 independent of whether the device 104 is in communication with the security entity 110. That is, the SEE 102 can implement the prescriptive operations dictated by the security policy 122 if the device 104 is online (connected to the security entity 110) or offline (e.g., disconnected from other nodes, including the security entity 110).

As a first example of implementation (hereinafter, "the first example"), it is presumed that the device 104 represents a smart thermostat. In such a situation, the security entity 110 can represent an end-user device (e.g., a smart phone or desktop/laptop computer) and the secure server 112 can represent an application (e.g., a software application or a web browser) with controls for adjusting parameters of the smart thermostat. Continuing with the first example, the I/O port 108 can be representative of a Wi-Fi port. Additionally, the environment interactor 114 can be representative of a thermometer (e.g., a sensor) and a signal actuator (e.g., a peripheral) for controlling the switching on and off of a heating, ventilation and air conditioning (HVAC). Additionally, the application 116 can be a client application for the secure server 112.

Continuing with the first example, the security manager 120 can configure the device 104 to allow the application 116 to control operations of the environment interactor 114. However, in the first example, if the secure watchdog timer 124 expires and the security manager 120 has not received a reset authorization token from the secure server 112 via the secure channel 115, the security manager 120 applies the prescriptive operation dictated by the security policy 122.

As noted, the prescriptive operation dictated by the security policy 122 can be commensurate with the number of expirations of the secure watchdog timer 124 since the last reset authorization token has been received by the security manager 120. Thus, in some examples, a less severe prescriptive operation can be executed with a first number of expirations of the secure watchdog timer 124 (e.g., corresponding to a relatively short amount of time), and a more severe prescriptive operation can be executed with a second number of expirations of the secure watchdog timer 124 (e.g., corresponding to a relatively long amount of time). As a simplified situation in the first example, if the secure watchdog timer 124 expires a number of times corresponding to about 12-24 hours (e.g., relatively short amount of time in the first example), the security policy 122 may dictate that the I/O port 108 is to be disabled for communications other than the communications on the secure channel 115, but that other operations including the actuation signals controlled by the application 116 are allowed to continue. Such a prescriptive operation may be selected since disabling communication on the I/O port 108 (other than communication on the secure channel 115) would prevent the device 104 from operating as a bot in a botnet attack. However, since connections to the security entity 110 may be intermittent, the REE 106 may not be presumed to be corrupted and/or compromised after about 12-24 hours of expiration of the secure watchdog timer 114 recorded by the security manager 120. Thus, in the first example, it is presumed that the REE 106 is operating properly, but as a caution, communication on the I/O port 108 are disabled until the reset authorization token is received from the secure server 112.

Continuing with the first example, if the secure watchdog timer 124 expires a number of times corresponding to about 24 hours or more (e.g., a relatively long amount of time in the first example), the security policy 122 may dictate disabling the I/O port 108 for communications other than the communications on the secure channel 115 and disabling execution of the actuation signals. Such a prescriptive operation may be selected since disabling communication on the I/O port 108 (other than communication on the secure channel 115) would prevent the device 104 from operating as a bot in a botnet attack and would prevent unauthorized operation of the HVAC system. However, in this situation, the prescriptive operation dictated by the security policy 122 may continue to allow readings of a memory local to the environment interactor 114 that stores data characterizing measured ambient temperature, since such operation has a low chance of inducing harm and may considered a non-sensitive operation.

As noted, in some examples, the security policy 122 may contain contextual constraints that dictates certain operations in particular contexts. Thus, continuing with the first example, in some situations, the security policy 122 can include operations for a low temperature trigger and/or a high temperature trigger. The low temperature trigger could dictate that if the thermometer (corresponding to the environment interactor 114) reports an ambient temperature of about 2 degrees Celsius or less that the security manager 120 is to provide an activation signal to activate (e.g., turn on) the heat. Similarly, the high temperature trigger could dictate that if the thermometer (corresponding to the environment interactor 114) reports an ambient temperature of 50 degree Celsius or more, the security manager 120 is to provide an activation signal to activate (e.g., turn on) the air conditioning. These operations can override the control of heat and/or air conditioning by the application 116.

Still further, in some instances of the first example, as part of the prescriptive operation, the security manager 120 can enable communication to the I/O port 108 to allow rewriting of the memory for the REE 106. In this manner, the device 104 can be restored to a functional state.

As a second example of implementation (hereinafter, "the second example"), it is presumed that the environment interactor 114 represents a fingerprint capturing device. In such a situation, the security entity 110 can represent an end-user device (e.g., a smart phone or desktop/laptop computer) and the secure server 112 can represent an application (e.g., a software application or a web browser) with control operations for capturing a fingerprint of a person. Continuing with the second example, the I/O port 108 can be representative of an Ethernet port or a USB port. Additionally, the environment interactor 114 can be representative of a fingerprint scanner (e.g., a sensor). Additionally, the application 116 can be a client application for the secure server 112.

Continuing with the second example, the security manager 120 can configure the device 104 to allow the application 116 to control operations of the environment interactor 114. However, in the second example, if the secure watchdog timer 124 expires and the security manager 120 has not received a reset authorization token from the secure server 112 via the secure channel 115, the security manager 120 applies the prescriptive operation dictated by the security policy 122.

Due to the high sensitivity of the nature of fingerprint scanning, the prescriptive operation dictated by the security policy 122 may be sweeping even with a relatively short time corresponding to expirations of the watchdog timer 124 without receipt of a reset authorization token. Stated differently, due to the security risk of a fingerprint scanner, in some examples, a severe, and sweeping prescriptive operation can be executed after a relatively short time after a failure to receive reset authorization tokens. As a simplified situation in the second example, if the secure watchdog timer 124 expires a number of times corresponding to about 1-10 minutes (or less, in some examples), the security policy 122 may dictate that the I/O port 108 is to be disabled for communications other than the communications on the secure channel 115, and that other operations including the scanning of fingerprints are disabled. Such a prescriptive operation may be selected since disabling communication on the I/O port 108 (other than communications on the secure channel 115) would prevent the device 104 from operating as a bot in a botnet attack. Additionally, since connections to the security entity 110 may be continuous, the REE 106 may be presumed to be corrupted and/or compromised after about 1 to about 10 minutes of expirations of the secure watchdog timer 124. Thus, in the second example, independent of whether the REE 106 is actually operating properly, as a caution, communication on the I/O port 108 are disabled (or limited) until the reset authorization token is received from the secure server 112.

Furthermore, in contrast to the first example, the prescriptive operation dictated by the security policy 122 in the second example may prevent reading of a local memory of the environment interactor 114 since such local memory can have (in some examples) sensitive data characterizing a scanned fingerprint. Thus, in addition to preventing botnet attacks, the SEE 102 prevents unauthorized distribution of sensitive information.

As a third example of implementation (hereinafter, "the third example"), it is presumed that the device 104 represents a time-based lock control device. In such a situation, the security entity 110 can represent an end-user device (e.g., a smart phone or desktop/laptop computer) and the secure server 112 can represent an application (e.g., a software application or a web browser) with control operations for opening and closing a lock. Continuing with the third example, the I/O port 108 can be representative of a WiFi and/or a Bluetooth port. Additionally, the environment interactor 114 can be representative of a lock on a safe. Additionally, the application 116 can be a client application for the secure server 112.

Furthermore, in the third example, the SEE 102 can include a secure clock. Moreover, as noted, in some examples, the security policy 122 may contain contextual constraints that dictates certain operations in particular contexts. Thus, continuing with the third example, in some situations, the security policy 122 may have time constraints for operating the lock. For instance, if the lock is door lock in a secure facility, the security policy 122 may dictate that the lock can only be opened at certain times of day and/or on certain dates.

Continuing with the third example, the security manager 120 can configure the device 104 to allow the application 116 to control operations of the environment interactor 114. However, in the third example, if the secure watchdog timer 124 expires and the security manager 120 has not received a reset authorization token from the secure server 112 via the secure channel 115, the security manager 120 applies the prescriptive operation dictated by the security policy 122.

Similar to the second example, due to the high sensitivity of the nature of secure doors, the prescriptive operation dictated by the security policy 122 may be sweeping even with a relatively short time corresponding to expirations of the watchdog timer 124 without receipt of a reset authorization token. Stated differently, due to the security risk of a unauthorized access to subject matter protected by the lock, in some examples, a severe, and sweeping prescriptive operation can be executed after a relatively short time after a failure to receive reset authorization tokens. As a simplified situation in the third example, if the secure watchdog timer 124 expires a number of times corresponding to about 1-10 minutes (or less, in some examples), the security policy 122 may dictate that the I/O port 108 is to be disabled for communications other than the communications on the secure channel 115, and that other operations including unlocking of the lock are disabled. Such a prescriptive operation may be selected since disabling communication on the I/O port 108 (other than communications on the secure channel 115) would prevent the device 104 from operating as a bot in a botnet attack. Additionally, since connections to the security entity 110 may be continuous, the REE 106 may be presumed to be corrupted and/or compromised after about 1 to about 10 minutes of expirations of the secure watchdog timer 124. Thus, in the third example, independent of whether the REE 106 is actually operating properly, as a caution, communication on the I/O port 108 are disabled (or limited) until the reset authorization token is received from the secure server 112.

Furthermore, in the third example, the security manager 120 may override control of the lock due to the noted contextual constraints included in the security policy 122. More particularly, the security manager 120 can be configured to override control of the lock if a contextual condition is not met. For example, if application 116 attempts to open the lock, the security manager 120 can query the internal clock and determine whether the present time and date is within a time outside a permitted window of time. If the present time is outside the time and date of the permitted window of time, the security manager 120 can command the lock (the environment interactor 114) to remain locked, such that an actuation signal for unlocking the lock is disabled by the security manager 120.

As a fourth example of implementation (hereinafter, "the fourth example"), it is presumed that the environment interactor 114 represents a location-based vehicle control device. In such a situation, the security entity 110 can represent an end-user device (e.g., a smart phone or desktop/laptop computer) and the secure server 112 can represent an application (e.g., a software application or a web browser) with controls operation for turning on and off a vehicle. Continuing with the fourth example, the I/O port 108 can be representative of a WiFi and/or a Bluetooth port. Additionally, the environment interactor 114 can be representative of an ignition of a vehicle. Additionally, the application 116 can be a client application for the secure server 112.

Furthermore, in the fourth example, the SEE 102 can include a secure global navigation satellite system (GNSS), such as a global positioning system (GPS). Moreover, as noted, in some examples, the security policy 122 may contain contextual constraints that dictates certain operations in particular contexts. Thus, continuing with the fourth example, in some situations, the security policy 122 may have location constraints for operating the ignition of the vehicle. For instance, if the vehicle is a vehicle available for rent, the security policy 122 may dictate that the ignition of the vehicle can only be turned on in certain jurisdictions to prevent the vehicle from being illegally exported.

Continuing with the fourth example, the security manager 120 can configure the device 104 to allow the application 116 to control operations of the environment interactor 114. However, in the fourth example, if the secure watchdog timer 124 expires and the security manager 120 has not received a reset authorization token from the secure server 112 via the secure channel 115, the security manager 120 applies the prescriptive operation dictated by the security policy 122.

Similar to the first example, in the fourth example the prescriptive operation dictated by the security policy 122 can be commensurate with the number of expirations of the secure watchdog timer 124 since the last reset authorization token has been received by the security manager 120. Thus, in some examples, a less severe prescriptive operation can be executed with a first number of expirations of the secure watchdog timer 124 (e.g., corresponding to a relatively short amount of time), and a more severe prescriptive operation can be executed with a second number of expirations of the secure watchdog timer 124 (e.g., corresponding to a relatively long amount of time). As a simplified situation in the first example, if the secure watchdog timer 124 expires a number of times corresponding to about 6-12 hours (e.g., a relatively short amount of time in the fourth example), the security policy 122 may dictate that the I/O port 108 is to be disabled for communications other than the communications on the secure channel 115, but that other operations including the actuation signals controlled by the application 116 are allowed to continue. Such a prescriptive operation may be selected since disabling communication on the I/O port 108 (other than communication on the secure channel 115) would prevent the device 104 from operating as a bot in a botnet attack. However, since connections to the security entity 110 may be intermittent, the REE 106 may not be presumed to be corrupted and/or compromised after about 12-24 hours of expiration of the secure watchdog timer 114 recorded by the security manager 120. Thus, in the fourth example, it is presumed that the REE 106 is operating properly, but as a caution, communication on the I/O port 108 are disabled until the reset authorization token is received from the secure server 112.

By employing the system 100, the SEE 102 is leveraged to configure access to sensitive operations of the environment interactor 114 (peripherals and/or sensors). For example, if the SEE 102 includes a secure element (e.g., with Java Card executing thereon) embedded in the device 104 and a TEE that is present on the device 104, the SEE 102 can control access to sensitive operations of the environment interactor 114 with privileges elevated relative to an application executing on the REE 106. Furthermore, inclusion of the secure watchdog timer 124 in the SEE 102 ensures that if the REE 106 is accessed in an unauthorized manner (e.g., hacked) or otherwise becomes corrupted, the prescriptive operation dictated by the security policy 122 is executed before significant harm is done, even in situations where the device 104 is offline.

Figure 3:
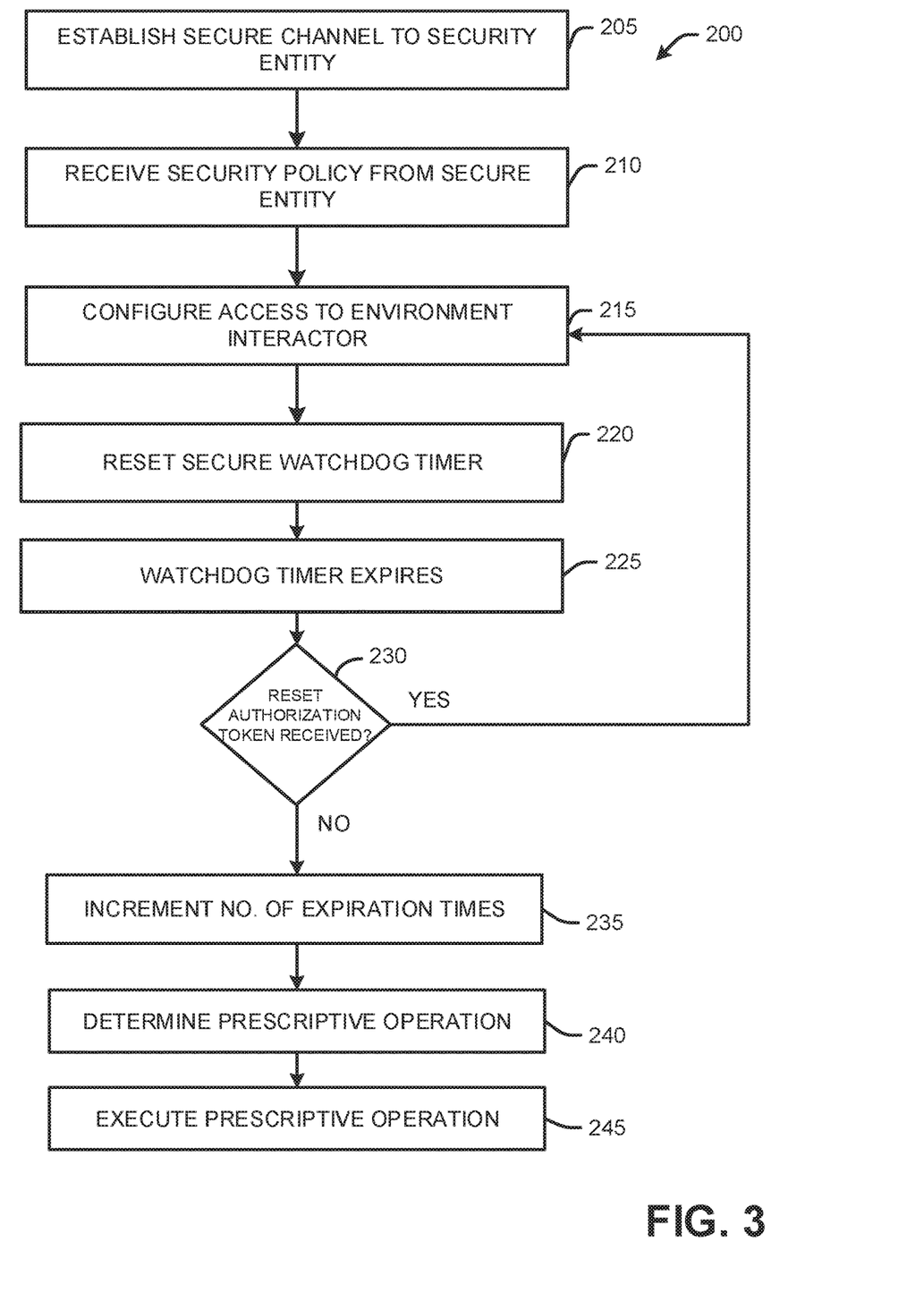
FIG. 3 illustrates a flowchart of example of a method for establishing and maintaining a security policy on a device.

In view of the foregoing structural and functional features described above, an example method will be better appreciated with reference to FIG. 3. While, for purposes of simplicity of explanation, the example method of FIG. 3 is shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 3 illustrates an example of a method 200 for establishing and maintaining a security policy on a device, such as an IoT device and/or an authentication device. The method 200 can be implemented, for example, by an SEE (e.g., the SEE 70 of FIG. 1 and/or the SEE 102 of FIG. 2) operating on a computing platform hosted by a device (e.g., the device 50 of FIG. 1 and/or the device 104 of FIG. 2). At 205, the SEE establishes a secure channel (e.g., the secure channel 115 of FIG. 2) between a security entity (e.g., the security entity 110 of FIG. 2) and the SEE of the device. The security entity can be remote from the device. Thus, the secure channel can traverse an I/O port (e.g., a wired or wireless communication port) of the device. Moreover, the computing platform of the device includes an REE (e.g., the REE 66 of FIG. 1 and/or the REE 106 of FIG. 2). In some examples, the REE includes an administrative agent that operates as a pass-through for the secure channel between the security entity and the SEE.

At 210, the SEE receives a security policy (e.g., the security policy 122 of FIG. 2) from the secure entity via the secure channel. The security policy can be implemented as a table with a list of prescriptive operations for a corresponding number of secure watchdog timer expirations since a last reset authorization token has been received at the SEE. At 215, a security manager (e.g., the security manager 120 executing on the SEE) configures access to sensitive operations of the environment interactor (e.g., a peripheral and/or a sensor such as the environment interactor 114 of FIG. 2). Such configuration can allow an application (e.g., the application 116 of FIG. 2) to control operations of the environment interactor.

At 220, the security manager can reset a secure watchdog timer (e.g., the secure watchdog timer 124 of FIG. 2) executing on the SEE. At 225, the secure watchdog timer expires. At 230, the security manager can make a determination as to whether the SEE received a reset authorization token from the security entity since the last reset of the secure watchdog timer. If the determination at 230 is positive (e.g., YES), the method 200 returns to 215. If the determination at 230 is negative (e.g., NO), the method proceeds to 235.

At 235, the security manager increments a recorded value corresponding to the number of times the secure watchdog timer has expired since a last reset authorization token has been received. At 240, the security manager determines a prescriptive operation (e.g., corrective and/or preventative operations) based on the security policy. That is, the security policy includes a list of prescriptive operations commensurate with the number of secure watchdog timer expirations. At 245, the security manager executes the prescriptive operation. As noted, in some examples, the prescriptive operations can include disabling an I/O port for communication other than communication via the secure channel. Additionally or alternatively, the prescriptive operations can include disabling actuation signals of the environment interactor and/or disabling access to memory of the environment interactor. Still further, in some examples, the prescriptive operation can include enable writing over the portion of memory of the device employed for the REE to restore the REE to a functional state. In some examples, upon executing the prescriptive operation, the method 200 can return to 220.

Figure 4:
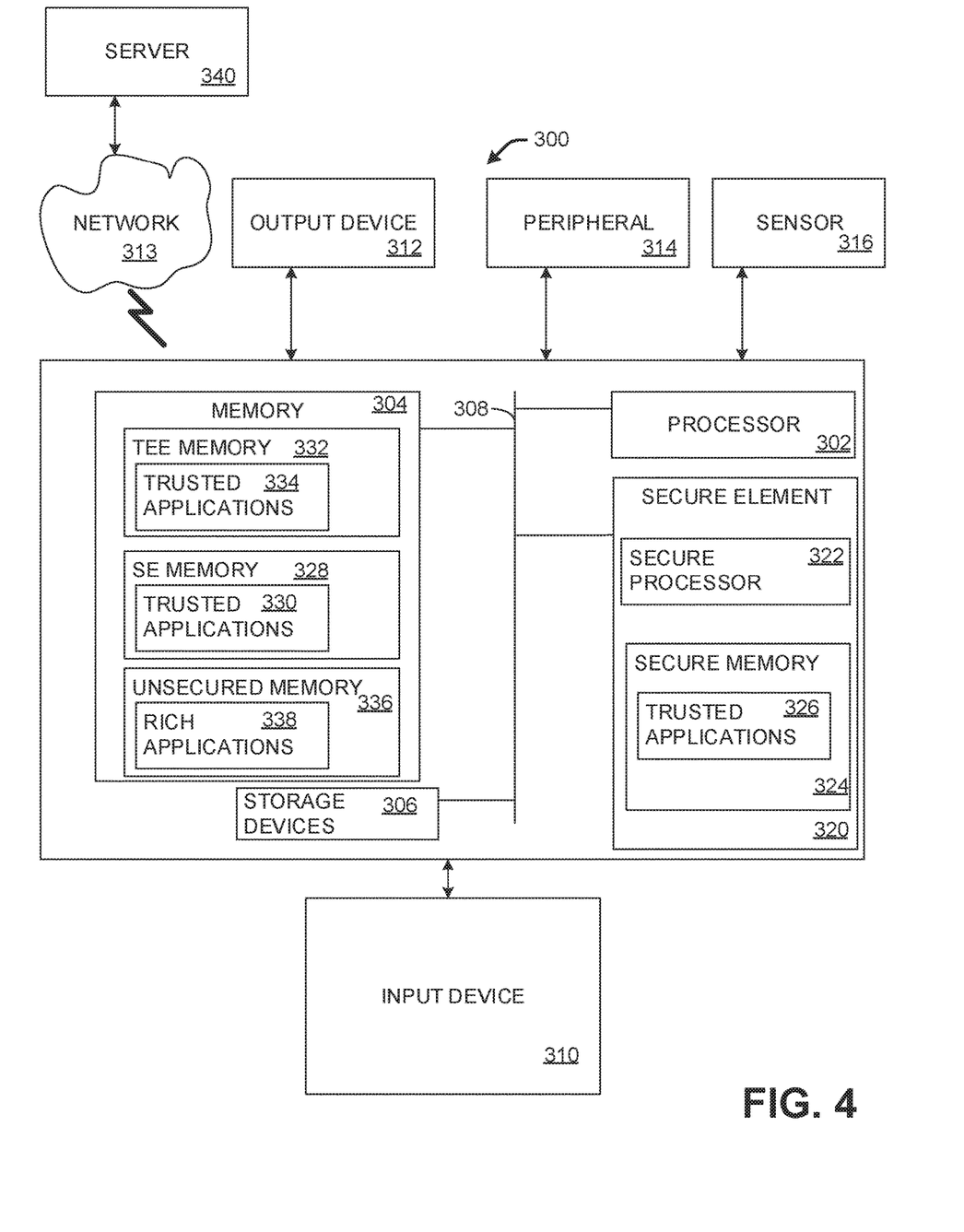
FIG. 4 illustrates an example of a computing system employable to implement an SEE.

The examples herein may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. As shown in FIG. 4, the computing system 300 can include a computer processor 302, associated memory 304 (e.g., random access memory (RAM), cache memory, flash memory, etc.), one or more storage device 306 (e.g., a solid state drive, a hard disk drive, an optical drive such as a compact disk (CD) drive or digital versatile disk (DVD) drive, a flash memory stick, etc.), and numerous other elements and functionalities. The computer processor 302 may be an integrated circuit for processing instructions. For example, the computer processor may be one or more cores, or micro-cores of a processor. Components of the computing system 300 can communicate over a data bus 308.

The computing system 300 may also include an input device 310, such as any combination of one or more of a touchscreen, keyboard, mouse, microphone, touchpad, electronic pen. Further, the computing system 300 can include an output device 312, such as one or more of a screen (e.g., light emitting diode (LED) display, an organic light emitting diode (OLED) display, a liquid crystal display (LCD), a plasma display, touchscreen, cathode ray tube (CRT) monitor, projector, or other display device), a printer, external storage, or any other output device. In some examples, such as a touch screen, the output device 312 can be the same physical device as the input device 310. In other examples, the output device 312 and the input device 310 can be implemented as separate physical devices. The computing system 300 can be connected to a network 313 (e.g., a local area network (LAN), a wide area network (WAN) such as the Internet, mobile network, or any other type of network) via a network interface connection (not shown). The input device and output device(s) can be connected locally and/or remotely (e.g., via the network 313) connected to the computer processor 302, the memory 304, and/or the storage device 306. Many different types of computing systems exist, and the aforementioned input device 310 and the output device 312 can take other forms. The computing system 300 can further include a peripheral 314 and a sensor 316 for interacting with the environment of the computing system 300 in a manner described herein.

Software instructions in the form of computer readable program code to perform embodiments disclosed herein can be stored, in whole or in part, temporarily or permanently, on a non-transitory computer readable medium such as a CD, DVD, storage device, a diskette, a tape, flash memory, physical memory, or any other computer readable storage medium. Specifically, the software instructions can correspond to computer readable program code that when executed by a processor, is configured to perform operations disclosed herein.

The computing system 300 can include a secure element 320 installed thereon. In some examples, the secure element 320 can be a removable device, such as a SIM card, in situations where the computing system 300 is implemented as a smart phone. In other examples, the secure element 320 can be an embedded secure element (eSE) that is hardwired to the data bus 308. In still other examples, including examples where the computing system 300 is implemented as a system on a chip (SoC), the secure element 320 can be implemented as an integrated secure element (iSE).

The secure element 320 can include an embedded secure processor 322 that can execute machine readable instructions separately from the processor 302. The machine readable instructions executed by secure processor 322 can be stored in a secure memory 324. The secure memory 324 is inaccessible to other components of the computing system 300. The secure memory 324 can include trusted applications 326 that are executable by the secure processor 322 of the secure element 320.

Additionally, in examples where the secure element 320 is an iSE (integrated secure element), the memory 304 can be partitioned to include SE (secure element) memory 328. The SE memory 328 of the memory can also store trusted applications 330 that can be the same or different applications than the trusted applications 326 of secure memory 324. Still further, the memory 304 can include a partition for TEE (trusted execution environment) memory 332 that also includes trusted applications 334 that can be the same or different from the trusted applications 326 and 330.

The memory 304 can also include a partition of unsecured memory 338. The unsecured memory 326 can include, for example, rich applications 338 that could be executed in a REE (rich execution environment), as described herein.

The trusted applications 326, 330 and 334 can include, but are not limited to applications configured for Java Card. Java Card provides a Java Card Virtual Machine and a runtime library to allow the same applet to execute on multiple different types of secure elements 320 or TEE. The Java Card Virtual machine encapsulates data and provides an applet firewall to protect against the unauthorized access of the data. Java Card bytecode that is run by the Java Card Virtual Machine is a functional subset of Java 2 bytecode run by a standard Java Virtual Machine but with a different encoding to adjust for size. A Java Card applet thus typically uses less bytecode than the hypothetical Java applet obtained by compiling the same Java source code to conserves memory. Java Card is employable for example, in situations where the secure element 320 is implemented as an application specific smart card, such as a SIM card (used in mobile phones), ATM cards and/or credit cards (e.g., EMV cards).

As described herein, the secure element 320 and a TEE can operate alone or in concert to provide an SEE (secure execution environment) to execute that monitors and controls the rich applications 336 executing on the REE. That is, the SEE can be hosted by the secure memory 324, the SE memory 328 and/or the TEE memory 332. Furthermore, the secure memory 324, the SE memory 328 and/or the TEE memory 332 can host data for the corresponding trusted applications 326, 330 and 334.

The computing system 300 can communicate with a server 340 via the network 313. In some examples, the connection between the server 340 and the computing system 300 can be a secure channel. More particularly the SEE (the secure element 320 and/or the TEE) can provide a communication endpoint for a secure channel. For purposes of simplification of explanation with respect to FIG. 4, it is presumed that the secure element 320 operates as a communication endpoint for the secure channel.

As one example, the secure element 320 can be implemented as a SIM card. A SIM card is a type of smart card that is employed on mobile devices to communicate with carrier networks. In fact, the SIM card can be employed to establish the secure channel between the server 340 and the secure element 320. The SIM card stores a unique identifier, namely an international mobile subscriber identity (IMSI) that can be provided to the server 340 on the carrier network. The server 340 can employ the IMSI provided from the SIM card to determine an authentication key (Ki), wherein the authentication key, Ki is also securely embedded on the SIM card. The server 340 can generate a random number and sign the random number, RAND with the authentication key, Ki of the SIM card to generate a first signed response, RSP1 and a (symmetric) encryption key, Kc. The server 340 returns the random number, RAND to the SIM card, wherein the SIM card signs the random number, RAND using the embedded authentication key, Ki to produce a second signed response, RSP2 and a copy of the encryption key, Kc. The SIM card passes the signed response, RSP2 to the secure server 340 and the SIM card securely stores the encryption key, Kc.

The secure server 340 compares the first response, RSP1 to the second response, RSP2. If the first response, RSP1 and the second response, RSP2 match, then both copies of the encryption key, Kc, namely the copy at the secure server 112 and the copy embedded on the SIM card, also match. In this manner, both the secure server 112 and the SIM card have an encryption key, Kc that can be employed as a symmetric encryption key. In this manner, the secure server 112 can be granted (or denied) communication privileges on a carrier network. In situations where the SIM card is removable, the privileges on the carrier network can follow the SIM card.

As noted, in some examples, the secure element 320 can be implemented as a credit card, and more particularly, an EMV card. In such a situation, the EMV card can be an IC card that is powered through contacts on the EMV card. Alternatively, the EMV can be a contactless card that receives power through inductive coupling when a reader is in relatively close physical proximity to the EMV card. That is, in both examples of a EMV card, an IC card or a contactless card, the EMV card is powered by a remote device. During a transaction with an EMV card, the secure processor 322 is configured to process information and determine rules that impact an outcome of the transaction. Such rules include enforcing services such as offline data authentication, user identification, online authorization, etc.

During a transaction with an EMV (implementing the secure element 320) the EMV sends an Authorization Request Cryptogram (ARCQ) in an authorization request for the transaction to the server 340. In response, the server 340, generates and returns an Authorization Response Cryptogram (ARPC) to the EMV. In response to the ARPC, the EMV can either generate a Transaction Certificate (TC) authorizing the transaction or an Application Authentication Cryptogram (AAC) that declines the transaction.

Further still, as noted, in some examples, the secure element 320 is implemented as a non-removable secure element, such as an eSE (embedded secure element) of an iSE (integrated secure element). In such a situation, the server 340 can implement a remote provisioning protocol set forth by the Global System for Mobile Communications (GSMA) association. Such standards define a computing platform that supports Java Card to enable the secure execution of the trusted applications 326 and 328.

Further, one or more elements of the aforementioned computing system 300 can be located at a remote location and connected to the other elements over the network 313. Further, some examples can be implemented on a distributed system having a plurality of nodes, where each portion of an embodiment can be located on a different node within the distributed system. In one example, the node corresponds to a distinct computing device. Alternatively, the node can correspond to a computer processor with associated physical memory. The node can alternatively correspond to a computer processor or micro-core of a computer processor with shared memory and/or resources.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A method for establishing and maintaining a security policy for a device, the method comprising:
    establishing a secure channel between a secure execution environment (SEE) operating on the device and a security entity external to the device;
    configuring, by a security manager executing on the SEE, access to sensitive operations of an environment interactor coupled to the device based on a security policy provided from the security entity; and
    resetting, by the security manager, a secure watchdog timer executing on the SEE in response to a reset authorization token provided from the secure entity;
    whereby, if the secure watchdog timer expires a given predetermined number of times since a last reset authorization token is received, the security manager executes a given prescriptive operation of a plurality of prescriptive operations dictated by the security policy and based on the given predetermined number of times the secure watchdog timer expires and if the secure watchdog timer expires another predetermined number of times since the last reset authorization token is received, the security manager executes another prescriptive operation of the plurality of prescriptive operations dictated by the security policy and based on the other predetermined number of times the secure watchdog timer expires, wherein the other predetermined number of times the secure watchdog timer expires is greater than the given predetermined number of times the secure watchdog timer expires.

2. The method of claim 1, wherein the given prescriptive operation disables a communication port of the device for communication other than communication via the secure channel.

3. The method of claim 2, wherein the communication port comprises at least one of a Wi-Fi port, a Bluetooth port and a Near Field Communication (NFC) port.

4. The method of claim 2, wherein the other prescriptive operation prevents the environment interactor from outputting an actuation signal and the other prescriptive operation prevents access to a memory local to the environment interactor.

5. The method of claim 1, wherein the security policy includes a contextual constraint, the method further comprising:
    determining, by the security manager, whether a contextual condition specified by the contextual constraint has been met; and
    disabling, by the security manager, the environment interactor from outputting an actuation signal in response to the contextual condition not being met.

6. The method of claim 1, wherein the environment interactor comprises at least one of a peripheral and a sensor.

7. The method of claim 1, claim 1, wherein the security policy includes a contextual constraint, the method further comprising:
    determining, by the security manager, whether a contextual condition specified by the contextual constraint has been met; and
    causing, by the security manager, the environment interactor to output an actuation signal in response to the contextual condition being met.

8. The method of claim 1, wherein the SEE comprises a discrete integrated circuit (IC) chip with an embedded secure element and the SEE operates in parallel with a rich execution environment (REE) executing on an application processor.

9. The method of claim 8, wherein the REE executes an administrative agent that provides a pass through for the secure channel between the SEE and the security entity.

10. The method of claim 9, wherein the given prescriptive operation enables the security entity to overwrite memory of the device corresponding to the REE.

11. The method of claim 1, wherein the SEE comprises a trusted execution environment (TEE) operating on an application processor in parallel with a rich execution environment (REE) operating on the application processor.

12. The method of claim 11, wherein the SEE further comprises a discrete integrated circuit (IC) chip with an embedded secure element and the SEE operates in concert with a rich execution environment (REE) executing on an application processor.

13. A non-transitory computer-readable storage medium storing program instructions that when executed by a computing platform operating on a device cause the computing platform to perform operations comprising:
    establishing a secure channel between a secure execution environment (SEE) operating on the device and a security entity external to the device;
    configuring, by a security manager executing on the SEE, access to sensitive operations of an environment interactor coupled to the device based on a security policy provided from the security entity; and
    resetting, by the security manager, a secure watchdog timer executing on the SEE in response to a reset authorization token provided from the secure entity;
    whereby, if the secure watchdog timer expires a given predetermined number of times since a last reset authorization token is received, the security manager executes a given prescriptive operation of a plurality of prescriptive operations dictated by the security policy and based on the given predetermined number of times the secure watchdog timer expires and if the secure watchdog timer expires another predetermined number of times since the last reset authorization token is received, the security manager executes another prescriptive operation of the plurality of prescriptive operations dictated by the security policy and based on the other predetermined number of times the secure watchdog timer expires, wherein the other predetermined number of times the secure watchdog timer expires is greater than the given predetermined number of times the secure watchdog timer expires.

14. The medium of claim 13, wherein the given prescriptive operation disables a communication port of the device for communication other than communication via the secure channel.

15. The medium of claim 14, wherein the other prescriptive operation comprises at least one of preventing the environment interactor from outputting an actuation signal and preventing access to a memory local to the environment interactor.

16. A device comprising a computing platform, the computing platform comprising:
  a rich execution environment (REE) for controlling operations of an environment interactor coupled to the device;
  a secure execution environment (SEE) operating on the device that communicates with a security entity external to the device via a secure channel, the SEE comprising:
    a security manager that configures access to sensitive operations of the environment interactor coupled to the device based on a security policy provided from the security entity; and
    a secure watchdog timer that is reset in response to a reset authorization token provided from the secure entity;
  whereby, if the secure watchdog timer expires a given predetermined number of times since a last reset authorization token is received, the security manager executes a given prescriptive operation of a plurality of prescriptive operations dictated by the security policy and based on the given predetermined number of times the secure watchdog timer expires and if the secure watchdog timer expires another predetermined number of times since the last reset authorization token is received, the security manager executes another prescriptive operation of the plurality of prescriptive operations dictated by the security policy and based on the other predetermined number of times the secure watchdog timer expires, wherein the other predetermined number of times the secure watchdog timer expires is greater than the given predetermined number of times the secure watchdog timer expires.

17. The device of claim 16, wherein the REE comprises an administrative agent that operates as a pass through of the secure channel between the security entity and the SEE.

18. The device of claim 17 wherein the given prescriptive operation comprises at least one of disabling a communication port of the device for communication other than communication via the secure channel, disabling actuation signals of the environment interactor and disabling access to a memory local to the environment interactor.

19. The device of claim 16, wherein the given prescriptive operation disables a communication port of the device for communication other than communication via the secure channel and the other prescriptive operation prevents the environment interactor from outputting an actuation signal and the other prescriptive operation prevents access to a memory local to the environment interactor.

20. The device of claim 16, wherein the given prescriptive operation enables the security entity to overwrite memory of the device corresponding to the REE.

* * * * *

UNITED STATES PATENT AND TRADEMARK OFFICE
CERTIFICATE OF CORRECTION

PATENT NO. : 11,232,217 B2
APPLICATION NO. : 16/211915
DATED : January 25, 2022
INVENTOR(S) : Ponsini It is certified that error appears in the above-identified patent and that said Letters Patent is hereby corrected as shown below:

In the Specification

In Column 6, Line 59, delete "Diffe-Hellman (ECHD)" and insert -- Diffie-Hellman (ECDH) --, therefor.

In the Claims

In Column 20, Line 15, in Claim 7, delete "claim 1, claim 1," and insert -- claim 1, --, therefor.

Signed and Sealed this
Seventeenth Day of May, 2022

Katherine Kelly Vidal
*Director of the United States Patent and Trademark Office*